(12) United States Patent
Li et al.

(10) Patent No.: US 7,727,319 B2
(45) Date of Patent: Jun. 1, 2010

(54) WATER-BASED INK SYSTEM

(75) Inventors: Jie Li, Allentown, PA (US); Leena Vadaketh, Doylestown, PA (US); Jacqueline Aseng, Bushkill, PA (US)

(73) Assignee: Crayola LLC, Easton, PA (US)

( * ) Notice: Subject to any disclaimer, the term of this patent is extended or adjusted under 35 U.S.C. 154(b) by 1078 days.

(21) Appl. No.: 11/406,906

(22) Filed: Apr. 19, 2006

(65) Prior Publication Data

US 2007/0245926 A1  Oct. 25, 2007

(51) Int. Cl.
*C09D 11/02* (2006.01)
(52) U.S. Cl. .............. 106/31.32; 106/31.64; 106/31.58; 106/31.86; 106/31.17; 106/31.16
(58) Field of Classification Search .............. 106/31.27, 106/31.6, 31.58, 31.86, 31.16, 31.17, 31.32, 106/31.64
See application file for complete search history.

(56) References Cited

U.S. PATENT DOCUMENTS

| | | | |
|---|---|---|---|
| 3,769,045 A | 10/1973 | Maierson et al. | |
| 4,022,936 A | 5/1977 | Miller et al. | |
| 4,028,118 A * | 6/1977 | Nakasuji et al. | 106/31.19 |
| 4,165,102 A | 8/1979 | Bodmer | |
| 4,165,103 A | 8/1979 | Bodmer | |
| 4,199,619 A | 4/1980 | Oda et al. | |
| 4,525,214 A | 6/1985 | Panken | |
| 4,601,920 A | 7/1986 | Mitsuo et al. | |
| 4,631,204 A | 12/1986 | Mitsuo | |
| 4,644,377 A | 2/1987 | Satomura et al. | |
| 4,675,706 A | 6/1987 | Miller et al. | |
| 4,731,353 A | 3/1988 | Hama et al. | |
| 4,734,395 A | 3/1988 | Ogata et al. | |
| 4,748,147 A | 5/1988 | Sumi-i et al. | |
| 4,748,148 A | 5/1988 | Kondo et al. | |
| 4,759,797 A | 7/1988 | Umeda et al. | |
| 4,769,305 A | 9/1988 | Sano et al. | |
| 4,803,192 A | 2/1989 | Saeki et al. | |
| 4,806,521 A | 2/1989 | Umeda et al. | |
| 4,820,684 A | 4/1989 | Sano et al. | |
| 4,822,768 A | 4/1989 | Ohga et al. | |
| 4,824,825 A | 4/1989 | Iida | |
| 4,833,119 A | 5/1989 | Umeda et al. | |
| 4,835,134 A | 5/1989 | Umeda et al. | |
| 4,835,135 A | 5/1989 | Umeda et al. | |
| 4,851,384 A | 7/1989 | Cooper | |

(Continued)

FOREIGN PATENT DOCUMENTS

EP  1 136 530  9/2001

(Continued)

OTHER PUBLICATIONS

International Search Report to International Application No. PCT/US2007/009519 dated Sep. 19, 2007.

(Continued)

*Primary Examiner*—Jerry Lorengo
*Assistant Examiner*—Veronica Faison Gee
(74) *Attorney, Agent, or Firm*—RatnerPrestia

(57) ABSTRACT

A no-mess water-based ink including a composition including water, an organic solvent, a coloring agent dissolved in the organic solvent and an emulsifier for use in conjunction with a specially treated substrate containing a color developer.

38 Claims, 1 Drawing Sheet

U.S. PATENT DOCUMENTS

| | | | |
|---|---|---|---|
| 4,857,502 | A | 8/1989 | Ueda et al. |
| 4,859,650 | A | 8/1989 | Hilterhaus et al. |
| 4,870,048 | A | 9/1989 | Matsuoka et al. |
| 4,877,767 | A | 10/1989 | Liang et al. |
| 4,880,766 | A | 11/1989 | Miller et al. |
| 4,910,183 | A | 3/1990 | Dwyer-Hallquist et al. |
| 4,929,710 | A | 5/1990 | Scholl et al. |
| 4,970,192 | A | 11/1990 | Cooper et al. |
| 4,978,390 | A | 12/1990 | Snedeker |
| 4,997,741 | A | 3/1991 | Watanabe |
| 5,008,237 | A | 4/1991 | Liang et al. |
| 5,011,445 | A | 4/1991 | Nakasuji et al. |
| 5,013,707 | A | 5/1991 | Phaff et al. |
| 5,017,546 | A | 5/1991 | Brinkman et al. |
| 5,024,987 | A | 6/1991 | Klug et al. |
| 5,024,988 | A | 6/1991 | Zink et al. |
| 5,028,581 | A | 7/1991 | Yamaguchi et al. |
| 5,030,281 | A | 7/1991 | Miller et al. |
| 5,043,314 | A | 8/1991 | Suzuki et al. |
| 5,053,277 | A | 10/1991 | Vassiliades |
| 5,075,278 | A | 12/1991 | Vassiliades |
| 5,084,593 | A | 1/1992 | Gotoh et al. |
| 5,094,688 | A | 3/1992 | Eckstein et al. |
| 5,102,856 | A | 4/1992 | Doll et al. |
| 5,130,290 | A | 7/1992 | Tanimoto |
| 5,137,797 | A | 8/1992 | Nakamura |
| 5,141,557 | A | 8/1992 | Higashiyama |
| 5,143,892 | A | 9/1992 | Zink |
| 5,162,289 | A | 11/1992 | Betts et al. |
| 5,178,949 | A | 1/1993 | Sakamoto et al. |
| 5,206,208 | A | 4/1993 | Liang et al. |
| 5,219,821 | A | 6/1993 | Arbee et al. |
| 5,260,403 | A | 11/1993 | Yamaguchi et al. |
| 5,300,473 | A | 4/1994 | Nakatsuka et al. |
| 5,329,006 | A | 7/1994 | Baumann et al. |
| 5,350,729 | A | 9/1994 | Londo et al. |
| 5,376,615 | A | 12/1994 | Yamaguchi et al. |
| 5,383,959 | A | 1/1995 | Sirdesai et al. |
| 5,427,886 | A | 6/1995 | Miller et al. |
| 5,460,647 | A * | 10/1995 | Snedeker et al. ............ 523/161 |
| 5,464,470 | A | 11/1995 | Brachman et al. |
| 5,464,803 | A | 11/1995 | McGuinness et al. |
| 5,466,281 | A | 11/1995 | Hanke et al. |
| 5,482,913 | A | 1/1996 | Satake et al. |
| 5,485,792 | A | 1/1996 | Keyser et al. |
| 5,486,228 | A | 1/1996 | Miller et al. |
| 5,489,501 | A | 2/1996 | Torii et al. |
| 5,503,665 | A | 4/1996 | Miller et al. |
| 5,525,686 | A | 6/1996 | Tanabe et al. |
| 5,536,761 | A | 7/1996 | Fujita |
| 5,643,357 | A * | 7/1997 | Breton et al. ............ 106/31.25 |
| 5,739,078 | A | 4/1998 | Yanagita et al. |
| 5,798,315 | A | 8/1998 | Etoh et al. |
| 5,814,579 | A | 9/1998 | Dotson et al. |
| 5,922,115 | A * | 7/1999 | Sano et al. ................ 106/31.32 |
| 5,932,515 | A | 8/1999 | Rourke |
| 5,968,241 | A | 10/1999 | Santini et al. |
| 6,071,852 | A | 6/2000 | Atkinson |
| 6,093,678 | A | 7/2000 | Hamada et al. |
| 6,124,377 | A | 9/2000 | Kaiser et al. |
| 6,160,034 | A | 12/2000 | Allison et al. |
| 6,197,722 | B1 | 3/2001 | Irving et al. |
| 6,228,804 | B1 | 5/2001 | Nakashima |
| 6,383,982 | B1 | 5/2002 | Kida et al. |
| 6,395,680 | B1 | 5/2002 | Morita et al. |
| 6,416,853 | B1 | 7/2002 | Nakashima et al. |
| 6,440,896 | B1 | 8/2002 | Szajewski et al. |
| 6,544,926 | B1 | 4/2003 | Bodmer et al. |
| 6,566,302 | B1 | 5/2003 | Taylor et al. |
| 6,613,716 | B2 | 9/2003 | Hoefs et al. |
| 6,793,721 | B2 | 9/2004 | Shen et al. |
| 6,830,612 | B1 * | 12/2004 | Yatake et al. ............ 106/31.58 |
| 6,846,619 | B2 | 1/2005 | Kaneko et al. |
| 6,890,614 | B2 | 5/2005 | Gore et al. |
| 6,905,539 | B2 | 6/2005 | Patel et al. |
| 6,908,505 | B2 | 6/2005 | Lawandy et al. |
| 6,953,345 | B1 | 10/2005 | Nakashima et al. |
| 2002/0143080 | A1 | 10/2002 | Yui et al. |
| 2003/0050363 | A1 | 3/2003 | Suzuki et al. |
| 2003/0089270 | A1 | 5/2003 | Shen et al. |
| 2003/0094117 | A1 | 5/2003 | Sir et al. |
| 2004/0214918 | A1 | 10/2004 | Banning et al. |
| 2005/0075420 | A1 | 4/2005 | Stovold |
| 2005/0165131 | A1 | 7/2005 | Stovold |
| 2005/0187102 | A1 | 8/2005 | Tsurumi et al. |
| 2005/0221206 | A1 | 10/2005 | Takayama et al. |

FOREIGN PATENT DOCUMENTS

| EP | 1 229 089 | 8/2002 |
|---|---|---|
| EP | 1 437 387 | 7/2004 |
| JP | 04 085374 A | 3/1992 |
| JP | 05 239946 A | 9/2005 |
| WO | WO 02/28659 | 4/2002 |

OTHER PUBLICATIONS

International Search Report corresponding to International Application No. PCT/US2007/009519 dated Sep. 19, 2007.

* cited by examiner

WATER-BASED INK SYSTEM

FIELD OF INVENTION

The present invention is directed generally to marking or coloring materials. Specifically, the present invention relates to a water-based ink composition and ink system that exhibits the characteristic of inhibiting stray coloring marks from appearing on surfaces other than those specially treated with a color developer.

BACKGROUND OF THE INVENTION

Because of the messiness of traditional inks, and in particular those inks in marking instruments used by children, there have been attempts to produce inks that are colorless until reacted with a specially treated surface or substrate. Traditionally, the preferred dyes used in these types of inks are leuco dyes chosen for their vivid, bold and intense colors. These leuco dyes are used in organic solvent-based compositions because most leuco dyes are insoluble in water. Some leuco dyes are water soluble, but those tend to require a large pH change from very high to very low, or vice versa, in order to effect color formation from the colorless state. This required pH change is generally undesirable. Although certain organic solvent-based compositions do provide the desired feature of reduced mess, the organic solvents used are relatively expensive, have undesirable odors, have a greasy feel and leave oily residues on paper or other surfaces.

As an alternative to organic solvent-based ink compositions, attempts have been made to utilize water as a solvent because of cost, odor elimination, and other benefits over the organic solvents. However, many of these types of dispersion ink compositions have slow color development and weak color intensity because the leuco dye cannot fully react with a color developer because the dyes are dispersed as solid particles or microcapsules in water. Therefore, it is difficult to obtain high color intensity with a water-based dispersion ink composition even when increased amounts of leuco dye are used.

SUMMARY OF THE INVENTION

In accordance with the present invention, in one aspect the invention provides a water-based ink composition comprising water, an organic solvent, a coloring agent dissolved in the organic solvent, and an emulsifier.

In another aspect, the invention provides an ink system comprising an oil-in-water emulsion and a color developer. The oil-in-water emulsion of this aspect comprises water, an organic solvent, a coloring agent dissolved in the organic solvent and an emulsifier.

In a third aspect, the invention provides a method of forming a water-based ink composition comprising the steps of dissolving a coloring agent in an organic solvent and emulsifying the organic solvent containing the coloring agent in water.

In a yet another aspect, the invention provides a water-based ink composition comprising water, an organic solvent, a coloring agent dissolved in the organic solvent and an emulsifier having an HLB value of about 8 or greater.

BRIEF DESCRIPTION OF THE DRAWINGS

The invention is best understood from the following detailed description when read in connection with the accompanying drawing. It is emphasized that, according to common practice, the various features of the drawing are not necessarily to scale. Included in the drawing is the following figure.

DETAILED DESCRIPTION OF THE INVENTION

Figure 1:
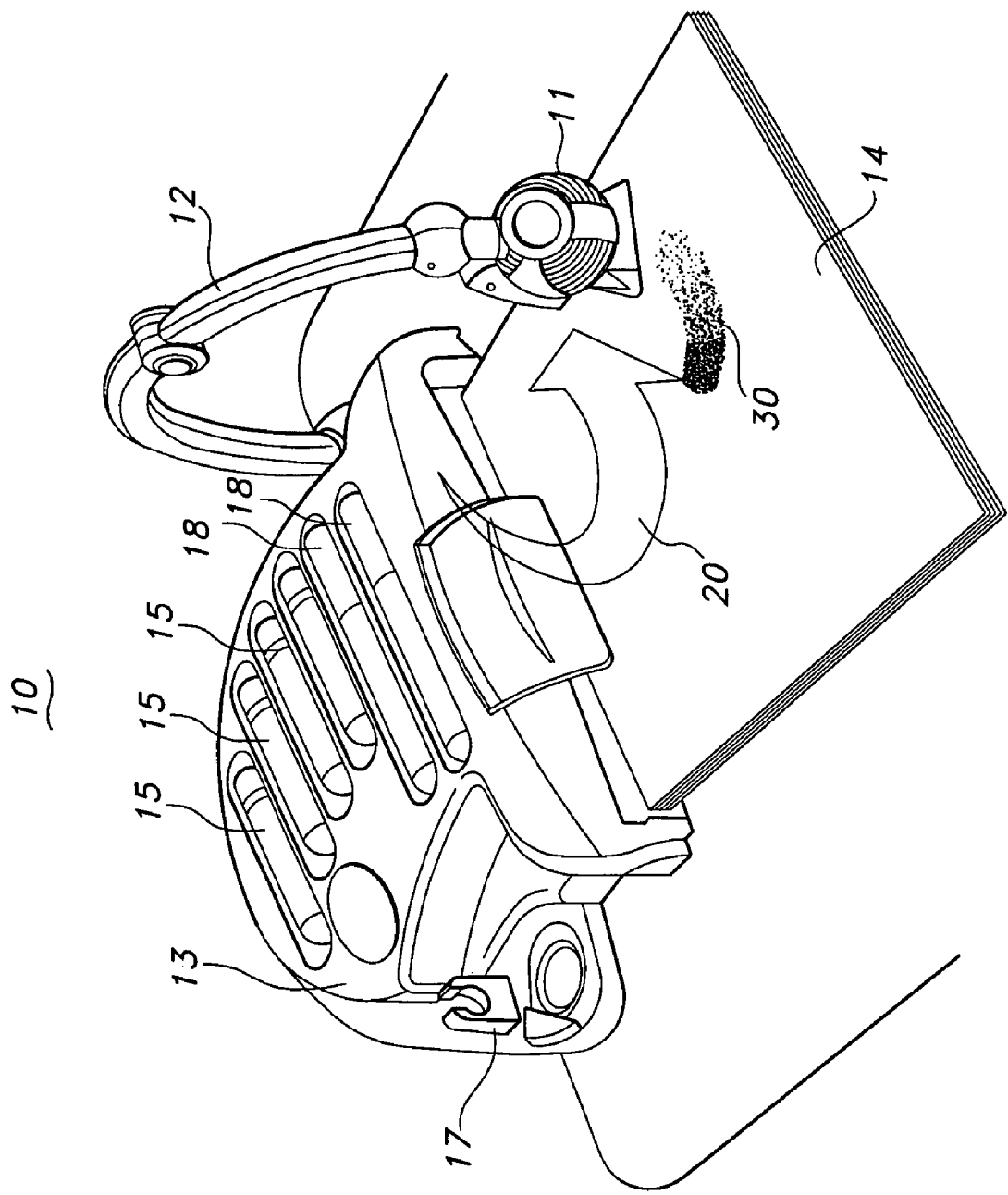
FIG. 1 is a schematic of a sprayer apparatus used for dispensing the water-based ink composition in accordance with the present invention.

Generally, according to the present invention, an unreacted colorless coloring agent as a solute is completely dissolved in an organic solvent. The resultant solution of solvent and solute (the organic solvent containing the coloring agent) is added to water with an emulsifier to emulsify the solution in water, with the water acting as a carrier. The organic solvent-based solution is emulsified and forms fine droplets, generally on the order of less than one micron, in the water. This emulsified water-based ink composition can then be used in a writing implement or other dispensing device to be applied to a specially treated surface containing a color developer. A preferred system of delivery is a sprayer, such as that shown in FIG. 1 and discussed more fully below.

As the aqueous emulsion is applied to the color developer-treated surface, a reaction between the color developer-treated surface and the coloring agent occurs, forming a visible color on the surface. As the water evaporates, more of the coloring agent dissolved in the organic solvent droplets is able to react with the color developer-treated surface increasing performance. However, complete evaporation of the water is not required. This emulsified water-based ink composition differs from previously attempted ink compositions and ink systems, such as those that are microencapsulated. By way of explanation, microencapsulation, which involves encapsulating a dye typically by a layer of polymer, further requires that the microencapsulated dye be released by manipulation of the capsule, for example by pressing or heating. No such manipulation by external forces is required with the water-based ink system as the water, acting as the carrier, readily evaporates leaving the organic solvent containing the leuco dye to react with the color developer of the treated surface.

In one aspect, the present invention is directed to a water-based ink composition comprising water, an organic solvent and a coloring agent dissolved in the organic solvent and an emulsifier. It is desirable that the organic solvent be completely saturated with the coloring agent to produce the most vivid and most intense color possible. It is recognized, however, that the organic solvent is not required to be completely saturated in order for a color to be generated. As one skilled in the art would recognize, adding coloring agent above the saturation point of the organic solvent would be undesirable because it would result in the precipitation of the coloring agent from the organic solvent. This would result in the excess coloring agent ultimately being wasted, among other potential drawbacks, as the coloring agents are typically insoluble in water, thereby needlessly resulting in an increased cost.

In an embodiment according to the present invention, the water-based ink composition includes a coloring agent, such as a leuco dye, that remains white until reacted with a color developer. The coloring agent may be present up to about 5% by weight. More preferably, the water-based ink composition includes a leuco dye present in an amount of about 0.05-5% by weight. Examples of suitable leuco dyes can be found in U.S. Pat. No. 6,124,377, incorporated herein by reference, and may include: diarylphthalide dyes, fluoran dyes, indolyphthalide dyes, acylluecoazine dyes, leucoauramine dyes, spiropyrane dyes, rhodaminelactam dyes, triarylmethane dyes and chromene dyes and combinations thereof.

Preferred leuco dyes include, but are not limited to, Spiro (12H-benzo(a)xanthene-12,1'(3'H)-isobenzofuran-3'-one,9-(diethylamino) (such as COPIKEM® 747), 3-[Butyl-2-methylindol-3-yl]-3-(1-octyl-2-methylindol-3-yl)-1(3H) isobenzofuranone (such as COPIKEM® 35 magenta), 2-'phenylamino-3'-methyl-6'-(dibutylamino) spiro[isobenzofuran-1(3H), 9'-(9H)-xanthen]-3-one (such as COPIKEM® 34 Black), substituted Phthalide (such as COPIKEM® 14 Orange), such as COPIKEM® 7 Grape, 2'Di(phenylmethyl)amino-6'(diethylamino)spiro(isobenzofuran-1(3H), 9'-(9H)xanthen)-3-one (such as COPIKEM® 5 green). Products identified under the COPIKEM®, PERGASCRIPT® and HODOGAYA® trademarks are commercially available from the Hilton Davis Company, Cincinnati, Ohio, Ciba Specialty Chemicals Corporation, High Point, N.C., and Hodogaya Chemical Company, Japan, respectively.

The solvent (or combination of solvents) into which the coloring agent is dissolved is desirably substantially clear and is selected such that the solubilized dye gives good color formation when reacted with the color developer (i.e., the solvent should solubilize a sufficient concentration of the leuco dye such that good color formation, based upon visual observation, ultimately results after color development occurs). Further, it is desirable that the leuco dye should not precipitate out of solution at room temperature over time.

In addition, the solvents should be substantially non-odorous. Strictly by way of example, the solvent for carrying the coloring agent can be selected from dimethyl adipate, diethyl succinate, dibutyl phthalate, chlorinated and fluorinated toluenes, such as parachlorobenzotrifluoride (e.g., OXSOL® 100, commercially available from Occidental Chemical Corporation, Dallas, Tex.), dibutyl maleate, canola oil, SOYCLEAR®, or combinations thereof. The concentration of the organic solvent present in the composition is preferably about 1-70% by weight. More preferably, the organic solvent is present in an amount of about 1-50% by weight and most preferably, the organic solvent is present in an amount of about 1-20% by weight.

The water-based ink composition is preferably an oil-in-water type of emulsion, including an organic solvent, a coloring agent, water and an emulsifier to effectuate the emulsification of the organic solvent in the water. As is known to one skilled in the art, an emulsifier is a type of surfactant and an emulsion is a mixture of two immiscible substances, one substance (the dispersed phase) dispersed in the other (the continuous phase). Emulsions tend to have a cloudy appearance because the phase interfaces (in the case of an oil-in-water emulsion, the boundary between oil and water) scatter light that passes through the emulsion. Emulsions can suffer from a number of instabilities as smaller droplets recombine to form larger ones. An emulsifier, which aids in the formation of an emulsion, has a balance between the hydrophilic and lypohilic end to stabilize the emulsion. The balance is described by the hydrophilic/lipophilic balance (HLB) value. Surfactants with lower HLB values are more lipophilic, while surfactants with higher HLB values are more hydrophilic. The balancing of the HLB value is important to the stability of the emulsion. For example, in an oil-in-water emulsion, if the HLB value is too low, it will impact the stability of the emulsion as the like phases will recombine preventing the formation of a stable emulsion. Generally, oil-in-water emulsions have an HLB value from about 8-18. It should be noted, however, that some other types of surfactants have HLB values that overlap this range, for example wetting agents generally have HLB values of 7-9. However, even though there may be overlap, the functional properties and, therefore, the capability to function in certain applications are significantly different.

Typical oil-in-water emulsifiers have a water attracting end and an oil attracting end that promote dispersion of the phase in which they do not dissolve very well. In oil-in-water type emulsions, such as those used in embodiments of the present invention, emulsifiers promote the dispersion of oil droplets through a continuous phase of water.

Examples of emulsifiers that may be used in the present invention have a preferred HLB value of about 8 or higher and achieve good emulsification in aqueous systems, such as that intended in the present invention. More preferably, the emulsifiers used in accordance with the present invention have HLB values of between about 10 and about 18. This emulsifier may be present in an amount of about 0.1-25% by weight. Examples of emulsifiers that are suitable for use in the present invention include ethoxylated alcohols, polyethoxylated (POE) castor oil, glycerol esters, polyoxyethylene (10) oleyl ether (such as BRIJ® 97), polyoxethylene (20) oleyl ether (such as BRIJ® 98), polyoxyethylene (35) lauryl ether (such as BRIJ® 35), sodium decyl diphenyl oxide disulfonate (such as CALFAX® 10L-45), sodium hexadecyl diphenyl oxide disulfonate (such as CALFAX® 16L-35) and polyglycerol ester (such as CAPROL® PGE 860). Water is present in an amount of about 30-97% by weight and acts as a carrier for the organic solvent containing coloring agent. The organic solvent is completely surrounded by the water.

In addition to the foregoing, the water-based ink composition may also include other additives to enhance performance of the ink composition. For example, at least one antioxidant may be added to the composition in order to prevent the premature oxidation of the dyes. The antioxidants are therefore provided to prevent chromophore development before it is desirable. Examples of suitable antioxidants include Vitamin E, Tinuvins (commercially available from Ciba Geigy), 3,5-bis(1,1-dimethylethyl)-4-hydroxy benzenepropanoic acid,2,2-bis[[3-[3,5-bis(1,1-dimethylethyl)-4-hydroxyphenyl]-1-oxopropoxy]methyl]1,3-propanediyl ester (commercially available from Ciba Specialty Chemicals Corporation as IRGANOX® 1010), octadecyl 3,5-Di-(tert)-butyl-4-hydroxyhydrocinnamate (commercially available from Ciba Specialty Chemicals Corporation as IRGANOX® 1076), 3,5-bis (1,1-dimethyl-ethyl)-4-hydroxy-C7-C9 branched alkyl esters (commercially available from Ciba Specialty Chemicals Corporation as IRGANOX® 1135), butylated hydroxytoluene (BHT), butylated hydroxyanisole (BHA), e.g., tert-butylhydroquinone (TBHQ), and combinations thereof. Desirably, the antioxidants are substantially water insoluble (so as to avoid washing out) and are not volatile when exposed to heat. With respect to volatilization, the antioxidants should desirably resist volatilization and evaporation at temperatures typically found in operating clothes dryers (such as temperatures of about of 80-85° C.). The amount of antioxidant provided in the marking composition can vary depending on the chemistry of the particular antioxidant. For example, Vitamin E is suitable at levels of about 5% by weight of the solution composition or higher. Other antioxidants, such as the Tinuvins, work well at lower concentrations, such as perhaps, about 2% by weight of the solution composition. Additionally, ultraviolet absorbing materials may also be added to inhibit the fading of the developed colors. Tinuvins are helpful in this regard as well.

In addition, the water-based ink composition may further comprise a freeze/thaw (F/T) stabilizer as an emulsion stabilizer. Examples of suitable F/T stabilizers include low molecular weight alcohols, glycols, glycerols, and combinations thereof. It is also contemplated that additives including preservatives (such as NUOSEPT® 95 commercially available by Creanova, Inc.), fungicides (such as 3-iodo-2-propanyl butyl carbamate commercially available by Troy Corporation as Troysan POLYPHASE® AF1), buffers, wetting agents and defoamers may also be used included in the composition according to the present invention.

In a second aspect, the present invention provides an ink system comprising an oil-in-water emulsion and a color developer. The oil-in-water emulsion comprises water, an organic solvent, a coloring agent dissolved in the organic solvent and an emulsifier as discussed above. The treated surface of the substrate has a coating which comprises a developer. The developer operates chemically with the color precursor to produce a chromophore resulting in the visible color on the substrate. The coating can also include a binder for retaining the coating components on the substrate. In this aspect, the oil-in-water emulsion contains the coloring agent which can be applied by way of marking instruments, such as a markers, sprayers, stamps, stamp pads, pens, paintbrush, and the like, to a specially coated surface or substrate, such as paper, containing a color developer.

In an embodiment where the ink composition can be in the form of a sprayable, water-based paint, the composition can be applied by use of the device illustrated in FIG. 1. FIG. 1 illustrates an apparatus for delivering spray paint to a surface containing a color developer.

As shown in FIG. 1, the paint (ink) delivery apparatus is in the form of a paint (ink) sprayer 10. Paint (ink) sprayer 10 comprises a sprayer head 11 from which the ink composition is dispersed onto surface 14, which has been treated with a color-developer. Sprayer head 11 is attached to the sprayer body 13, which can be positioned on a flat surface, for example a tabletop or floor. Sprayer body 13 and sprayer head 11 are linked by sprayer arm 12, which is semi-rigid and is capable of swiveling and bending. This allows the sprayer head to be positioned to spray the ink over the entirety of the treated surface 14, as indicated schematically in FIG. 1 by arrow 20. Located within the sprayer head 11, but not shown, is a slot for receiving a removable cartridge containing ink. The cartridge may be interchanged with other cartridges of a similar design, each containing inks of different colors, thereby allowing the user to paint the treated surface with a variety of colors. The exemplary embodiment shown illustrates several cartridges 15 snap-fit to sprayer body 13. Included in this exemplary embodiment are markers 18 that can supplement the creation of marks on the treated paper. Suitable markers may include non-water-based markers, such as CRAYOLA® COLOR WONDER™ markers by Binney and Smith, Inc. Also, on the handle of the sprayer head 11 but not shown is an exemplary activator button which the user presses to cause the sprayer to eject the water-based ink composition. The sprayer needs a power source and a pump, which would be known to those skilled in the art after reading this disclosure. When not in use, this exemplary embodiment allows for the folding of arm 12 back onto body 13 where it can be clipped and held in place by clip 17.

Marking the treated surface of the substrate produces color on the substrate corresponding to the selected color of the leuco dye of the marking instrument. An exemplary mark is shown as mark 30 in FIG. 1. Little or no color mark is developed by spraying the ink composition on surfaces other than the treated surface. Advantageously, as a child or other user applies the marking composition to the treated substrate surface, in accordance with the present invention, a bright, bold, vivid color is formed on the substrate. Furthermore, the color is not easily transferred from the substrate. The present invention inhibits the development of color marks if the child sprays or otherwise applies the composition to his or her skin, clothing, or other unintended surfaces. If, however, undesired stains are developed on household surfaces or other unintended surfaces, such stains can be readily removed via washing. In addition, the water-based ink composition of the present invention does not have a greasy feel and does not leave oily residues on paper or other surfaces on which it is applied.

Using any of the above-mentioned means for applying the oil-in-water emulsion, the oil-in-water emulsion is applied to a specially treated surface or substrate. The substrate coating comprises a color-triggering developer, which serves as a chemical activator or initiator for the conversion of the color precursor into chromophore containing dyes that display bold and vivid colors. When the coloring agent is a leuco dye, the color developer may be one or more Lewis acids. The most desirable Lewis acids for use as the color developer of the present invention are zinc-containing resins. Activated clays and phenolic resins are also possible, but generally will provide a relatively slower rate of reactivity. In addition, clays and phenolic resins can form color-forming complexes that are undesirably water soluble. This water solubility can be problematic because water can then remove the color marks from the coating (unless of course removability from the paper or treated surface is desirable).

The color complexes of the marks formed by the use of zinc-containing developers are not particularly water sensitive and, accordingly, the color is less apt to be removed from the paper (or treated surface) and is not rendered potentially messy. Most preferably, an especially desirable color developer is a zincated carboxylic resin that is dispersed in the coating. For example, the zinc acts as a Lewis acid and causes the rearrangement of the dye molecule, thereby resulting in the development of the desired chromophore. Particularly, the development of the color occurs when the color developer reacts with the leuco dye to form a highly conjugated compound thereby resulting in a chromophore of intense color. The color-triggering developer is present in a concentration of at least about 12% by weight of the coating in order to achieve a desired intensity for the colors. Levels of color developer below about 12% can be utilized, but may result in the development of weaker colors.

The developer is preferably dispersed in water prior to application. The coating is desirably also provided with a void cell former, such as, for example, calcium carbonate. The calcium carbonate is precisely geometrically formed such that it forms a void cell in the coating. The void cell functions by capillary action. Particularly, the calcium carbonate is designed to hold the developed ink in a cell to prevent ink penetration into and across the substrate in order to prevent smearing of the developed ink.

The calcium carbonate and other solid ingredients are held onto the substrate by at least one binder, such as, for example, starch-modified latex. The latex can be cross-linked, such as perhaps with a zinc or zirconium salt, to enhance the strength of the film. For example, after the coating dries, cross-linking occurs, especially by application of heat. Desirably, the coating can be deposited on the substrate in a concentration of at least about ten grams of dry coating per each square meter of substrate. Lower ratios of coating deposition are less desirable because they generally result in the formation of less intense colors. Particularly desirable substrates include papers that have barrier properties such as those used in cereal packaging and other printing applications requiring solvent resistance. However, the substrate can be formed of any of a variety of materials. As such, other substrates, especially those formed from paper, wood, and/or plastic, are contemplated and are encompassed by the present invention.

It may be desirable to include a plasticizer in the coating. A plasticizer can facilitate the ability of the leuco dye to penetrate the coating more rapidly, thereby resulting in a faster color-formation reaction. Accordingly, the plasticizer increases the reactivity (e.g., by a factor of 10). Examples of plasticizers include, but are not limited to, dibutyl phthalate and citrate ester (e.g., CITROFLEX® A4). In addition, an oil absorption enhancer, such as, for example, diatomaceous earth, can be included in the coating composition.

Significantly, the color marks formed from the leuco dye and the Lewis acid color developer are washable in the event that color marks form on unintended surfaces. In this regard, although the present invention inhibits the formation of color marks on unintended surfaces, color marks could be formed inadvertently in some environments. For example, laundry detergents contain zwitterions designed to be acidic and basic at the same time to facilitate soil removal. The acids in the laundry detergent can cause color development on fabrics marked with the leuco dyes during washing with most conventional laundry detergents commonly used when washing clothes in a washing machine. In addition, many fabrics, such as cotton, contain natural fatty acids which can trigger color development with leuco dyes, especially when exposed to heat, as is typically found in a clothes dryer. In this regard, heating can accelerate the formation of color. Moreover, while the present invention inhibits the formation of color, if color does form, those unintended marks are washable.

In another aspect, the present invention provides a method of forming a water-based ink composition comprising the steps of dissolving a coloring agent in an organic solvent and emulsifying the organic solvent containing the leuco dye in water. The dissolving step may include saturating the organic solvent with the coloring agent, however, as noted above, this is not required so long as enough coloring agent is included to react with the color developer to form an image of sufficient, desirable intensity. In addition, the method of forming a water-based ink composition further may comprise the step of mixing the organic solvent containing the coloring agent with an emulsifier before the emulsifying step. Ink compositions according to this method result in less residual solvent when applied as compared to organic solvent-based ink compositions.

EXAMPLES

Exemplary water-based ink compositions according to the present invention are provided in the following examples. In each of the examples, a "pre-mix" was prepared, which included dissolving a selected leuco dye in an organic solvent in accordance with methods familiar to those of ordinary skill in the art of producing organic solvent solutions. Each of these pre-mixes was next added with an emulsifier to water to produce an oil-in-water type emulsion also in accordance with methods familiar to those of ordinary skill in the art for making oil-in-water emulsions. For example, emulsification of the composition according to the invention can be performed by ultrasonic dispersing or grinding. Emulsion stability is reported in the tables below by using subjective standards, such as "V.G." for very good emulsion stability, "G" for good emulsion stability, "M" for moderate stability and "P" for poor emulsion stability.

Example 1

A pre-mix comprising a leuco dye was prepared and dissolved in an organic solvent as identified in Table 1 below. After the leuco dye was determined to be completely dissolved in the organic solvent, an emulsion having the components identified in Table 1 was prepared. In this test, four different emulsifiers, alone and in combination, were tested to determine which would produce the most stable emulsion. Results of this test are shown in Table 1, which indicate that BRIJ® 97 (HLB of about 12.4) provided good emulsion stability while also using a mixture of approximately half water and half pre-mix. CALFAX® 10L-45 (HLB of about 17.8) also produced good emulsion stability, however, BRIJ® 97 outperformed CALFAX®10L-45 because the CALFAX®10L-45 required a higher concentration of the pre-mix to produce good results. The other emulsifiers and emulsifier combinations, while suitable to produce emulsions having moderate or good/moderate emulsion stability, produced less desirable results than BRIJ® 97 using approximately the same concentrations of pre-mix and water.

Example 2

Pre-mixes comprising leuco dyes for producing yellow and red colors were prepared and dissolved in three different organic solvents as identified in Table 2 below. After the leuco dyes were determined to be completely dissolved in their respective organic solvents, emulsions including the components identified in Table 2 were prepared. In this example, the leuco dyes were tested using two different emulsifiers, BRIJ® 97 (HLB of about 12.4) and SURFYNOL® SE (HLB of about 4-6). The concentrations of each of the constituents tested as well as the results of the test are shown at Table 2, which indicates that the combination of the solvent SOYCLEAR® 1500 and the emulsifier BRIJ® 97 produce the best emulsion stability, even where SURFYNOL® SE was included. It was also determined that using SURFYNOL® SE in combination with SOYCLEAR® 1500 produced poor results. This indicates that surfactants with such low HLB values do not act as good emulsifiers. The inventors also determined that the solvent dimethyl adipate (DMA) is incompatible with BRIJ® 97 when used to produce the yellow and red colors of this example.

Example 3

Similar to Example 2, pre-mixes comprising leuco dyes for producing yellow and red colors were prepared and dissolved in SOYCLEAR® 1500 as shown in Table 3 below. After the leuco dyes were determined to be completely dissolved in the solvent, emulsions including the components identified in Table 3 were prepared. In this test, the two colors were tested using only one emulsifier, BRIJ® 97, to determine the significance of different concentrations on emulsion stability using this emulsifier. The concentrations tested and the results of the test are shown at Table 3, which indicated that as the concentration of water decreased and the concentration of the pre-mix increased, the stability of the emulsion decreased.

It should be noted that when preparing the pre-mix, the inventors determined that at a concentration of 8.0 wt % of the leuco dye, Yellow 37, in the solution containing SOYCLEAR® 1500 as the solvent, the leuco dye precipitated out of solution overnight. A similar composition having a concentration of 6.0 wt % of Yellow 37 and also using SOYCLEAR® 1500 as the solvent resulted in precipitation of the leuco dye out of solution over a period of one week. Therefore, the inventors concluded that a solution containing approximately 5 wt % of Yellow 37 would remain in solution for a significantly longer and more desirable period of time.

Example 4

Pre-mixes comprising leuco dyes for producing a variety of colors dissolved in SOYCLEAR® 1500 at 160-180° F. were prepared, as listed in Table 4. Each pre-mix solution was added with IRGANOX® 1135, POLYPHASE® AF-1 and BRIJ® 97 to a container and mixed by hand. Next, water, glycerin and NUOSEPT® 95 were mixed in a separate container, then poured into the mixture containing the pre-mix. The mixture was shaken and ultrasonically dispersed. A listing of each of the emulsions produced according to Example 4 are listed in Table 4, as well as the test results of each of the emulsions. Each of the samples tested in Example 4 produced good results using BRIJ® 97 as the emulsifier.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

TABLE 1

|  | Purple | | | | | | | | | |
|---|---|---|---|---|---|---|---|---|---|---|
| PRE-MIX (parts) | | | | | | | | | | |
| Dibutyl maleate (solvent) | 73.55 | | | | | | | | | |
| Irganox 1135 (antioxidant) | 15.00 | | | | | | | | | |
| Triton N-57 (surfactant) | 10.00 | | | | | | | | | |
| Tridodeclyamine 85% (buffer) | 1.30 | | | | | | | | | |
| Temp. (degrees F.) | 170 | | | | | | | | | |
| Dyes | | | | | | | | | | |
| Copikem Grape 7 | 0.15 | | | | | | | | | |
| Total | 100 | | | | | | | | | |
| EMULSIFICATION (parts) | | | | | | | | | | |
| Pre-mix | 50 | 50 | 50 | 50 | 50 | 50 | 50 | 50 | 60 | 70 |
| Water | 50 | 50 | 50 | 50 | 50 | 50 | 50 | 50 | 40 | 30 |
| Brij 97 (emulsifier) | 1 | | | | 1 | | | | | |
| Brij 98 (emulsifier) | | 1 | | | | 1 | | 1 | | |
| Calfax 10L-45 (emulsifier) | | | 1 | | | | 1 | 1 | 2 | 1 | 1 |
| Calfax 16L-35 (emulsifier) | | | | 1 | | 1 | | | | |
| RESULTS | | | | | | | | | | |
| Emulsion Stability | G | G | G/M | G/M | G/M | G/M | G/M | G/M | G | G |

TABLE 2

|  | Yellow | Yellow | Red | Red | Red | Red | Yellow |
|---|---|---|---|---|---|---|---|
| PRE-MIX (parts) | | | | | | | |
| Dibutyl maleate (solvent) | | | 99.00 | 99.00 | | | 98.00 |
| SOYCLEAR 1500 (solvent) | 98.00 | 98.00 | | | 99.00 | 99.00 | |
| Dimethyl adipate (solvent) | | | | | | | |
| Temp. (degrees F.) | 170 | 170 | 170 | 170 | 170 | 170 | 170 |
| Dyes | | | | | | | |
| Pergascript Red I-6B (dye) | | | 1.00 | 1.00 | 1.00 | 1.00 | |
| Copikem Yellow 37 (dye) | 2.00 | 2.00 | | | | | 2.00 |
| Total | 100 | 100 | 100 | 100 | 100 | 100 | 100 |
| EMULSIFICATION (parts) | | | | | | | |
| Pre-mix | 49 | 49 | 49 | 49 | 49 | 49 | 49 |
| Water | 49 | 49 | 49 | 49 | 49 | 49 | 49 |
| Brij 97 (emulsifier) | 2 | | 2 | | 2 | | 2 |
| Surfynol SE (emulsifier) | | 2 | | 2 | | 2 | |
| RESULTS | | | | | | | |
| Emulsion Stability | V.G | P | G | M | V.G. | P | G |
|  | Yellow | Yellow | Yellow | Red | Red | Yellow | Yellow |
| PRE-MIX (parts) | | | | | | | |
| Dibutyl maleate (solvent) | 98.00 | | | | | | |
| SOYCLEAR 1500 (solvent) | | | | | | 98.00 | |
| Dimethyl adipate (solvent) | | 98.00 | 98.00 | 98.00 | 98.00 | | |
| Temp. (degrees F.) | 170 | 170 | 170 | 170 | 170 | 170 | 170 |

TABLE 2-continued

| Dyes | | | | | | | |
|---|---|---|---|---|---|---|---|
| Pergascript Red I-6B (dye) | | | | 2.00 | 2.00 | | |
| Copikem Yellow 37 (dye) | 2.00 | 2.00 | 2.00 | | | 2.00 | |
| Total | 100 | 100 | 100 | 100 | 100 | 100 | 100 |
| EMULSIFICATION (parts) | | | | | | | |
| Pre-mix | 49 | 49 | 49 | 49 | 49 | 49 | 49 |
| Water | 49 | 49 | 49 | 49 | 49 | 49 | 49 |
| Brij 97 (emulsifier) | | 2 | | 2 | | 1 | 2 |
| Surfynol SE (emulsifier) | 2 | | 2 | | 2 | 2 | 1 |
| RESULTS | | | | | | | |
| Emulsion Stability | M | P | P | P | P | V.G | P |

TABLE 3

| | Yellow | Red | Yellow | Red | Yellow | Red | Yellow | Red | Yellow |
|---|---|---|---|---|---|---|---|---|---|
| PRE-MIX (parts) | | | | | | | | | |
| SOYCLEAR 1500 (solvent) | 94.00 | 96.00 | 94.00 | 96.00 | 94.00 | 96.00 | 94.00 | 96.00 | 94.00 |
| Temp. (degrees F.) | 170 | 170 | 170 | 170 | 170 | 170 | 170 | 170 | 170 |
| Dyes | | | | | | | | | |
| Pergascript Red I-6B (dye) | | 4.00 | | 4.00 | | 4.00 | | 4.00 | |
| Copikem Yellow 37 (dye) | 6.00 | | 6.00 | | 6.00 | | 6.00 | | 6.00 |
| Total | 100 | 100 | 100 | 100 | 100 | 100 | 100 | 100 | 100 |
| EMULSIFICATION (parts) | | | | | | | | | |
| Pre-mix | 20 | 20 | 20 | 20 | 30 | 30 | 48 | 48 | 70 |
| Water | 78 | 78 | 76 | 76 | 68 | 68 | 50 | 50 | 29 |
| Brij 97 (emulsifier) | 2 | 2 | 4 | 4 | 2 | 2 | 2 | 2 | 1 |
| RESULTS | | | | | | | | | |
| Emulsion Stability | G | G | G | G | G/M | G/M | G/M | G/M | M |

TABLE 4

| | A | B | C | D | E |
|---|---|---|---|---|---|
| PRE-MIX (parts) | | | | | |
| SOYCLEAR 1500 | 96.34 | 99.55 | 98.50 | 98.78 | 96.34 |
| Temp. (° F.) | 160-180 | 160-180 | 160-180 | 160-180 | 160-180 |
| Dyes | | | | | |
| Pergascript Red I-6B | 3.66 | | | | |
| Copikem Grape 7 | | 0.45 | | | |
| Copikem Cyan 39 | | | 1.50 | | |
| Hodogaya Orange DCF | | | | 1.22 | |
| Copikem Yellow 37 | | | | | 3.66 |
| Total | 100 | 100 | 100 | 100 | 100 |

| | Magenta | Purple | Cyan | Blue | Orange | Green | Fuchsia | Red |
|---|---|---|---|---|---|---|---|---|
| EMULSIFICATION (parts) | | | | | | | | |
| Pre-mix | 16.4 (A) | 16.4 (B) | 16.4 (C) | 10.0 (B) 6.40 (C) | 16.4 (D) | 6.40 (C) 10 (E) | 11.00 (A) 5.40 (C) | 3.10 (A) 13.3 (D) |
| Water | 73.6 | 73.6 | 73.6 | 73.6 | 73.6 | 73.6 | 73.6 | 73.6 |
| Irganox 1135 (antioxidant) | 1.5 | 1.5 | 1.5 | 1.5 | 1.5 | 1.5 | 1.5 | 1.5 |
| Brij 97 (emulsifier) | 5.00 | 5.00 | 5.00 | 5.00 | 5.00 | 5.00 | 5.00 | 5.00 |
| Glycerin (F/T stabilizer) | 3.00 | 3.00 | 3.00 | 3.00 | 3.00 | 3.00 | 3.00 | 3.00 |

TABLE 4-continued

| | | | | | | | | |
|---|---|---|---|---|---|---|---|---|
| Nuosept 95 (preservative) | 0.3 | 0.3 | 0.3 | 0.3 | 0.3 | 0.3 | 0.3 | 0.3 |
| Polyphase AF1 (fungicide) | 0.2 | 0.2 | 0.2 | 0.2 | 0.2 | 0.2 | 0.2 | 0.2 |
| RESULTS | | | | | | | | |
| Emulsion Stability | G | G | G | G | G | G | G | G |

What is claimed:

1. A colorless water-based ink composition comprising:
water;
an organic solvent;
a colorless coloring agent dissolved in the organic solvent; and
an emulsifier;
the organic solvent which contains the dissolved colorless coloring agent is emulsified in the water,
wherein a visible color results when the coloring agent reacts with a color developer.

2. The water-based ink composition of claim 1 wherein the organic solvent is saturated with the coloring agent.

3. The water-based ink composition of claim 1 wherein the organic solvent with the coloring agent dissolved therein is emulsified in the water.

4. The water-based ink composition of claim 1 wherein the water is present in an amount of about 30-97% by weight.

5. The water-based ink composition of claim 1 wherein the coloring agent is a leuco dye.

6. The water-based ink composition of claim 1 wherein the coloring agent is a leuco dye present in an amount of up to about 5% by weight.

7. The water-based ink composition of claim 1 wherein the coloring agent is a leuco dye present in an amount of about 0.05-5% by weight.

8. The water-based ink composition of claim 1 wherein the coloring agent is a leuco dye selected from the group consisting of phthalide dyes, diarylphthalide dyes, quinone dyes, fluoran dyes, indolyphthalide dyes, acylluecoazine dyes, leucoauramine dyes, spiropyrane dyes, rhodaminelactam dyes, triarylmethane dyes, and chromene dyes, and combinations thereof.

9. The water-based ink composition of claim 1 wherein the coloring agent is a leuco dye selected from the group consisting of Spiro(12H-benzo(a)xanthene-12,1'(3'H)isobenzofuran-3'-one,9-(diethylamino-),3-[Butyl-2-methylindol-3-yl]-3-(1-octyl-2-methylindol-3-yl)-1(3H)isobenz-ofuranone, 2-'phenylamino-3'-methyl-6'-(dibutylamino)spiro[isobenzofuran-1-(3H), 9'-(9H)-xanthen]-3-one, substituted Phthalide, 2'-Di(phenylmethyl)amino-6'-(diethylamino)spiro(isobenzofuran-1(3H), 9'(9H)xanthen)-3-one.

10. The water-based ink composition of claim 1 wherein the organic solvent is present in an amount of about 1-70% by weight.

11. The water-based ink composition of claim 1 wherein the organic solvent is selected from the group consisting of dimethyl adipate, diethyl succinate, dibutyl phthalate, chlorinated fluorinated toluenes, dibutyl maleate, canola oil, fatty acid methyl esters and combinations thereof.

12. The water-based ink composition of claim 1 wherein the emulsifier is present in an amount of about 0.1-25% by weight.

13. The water-based ink composition of claim 1 wherein the emulsifier is selected from group consisting of ethoxylated alcohols, POE caster oil, and glycerol esters.

14. The water-based ink composition of claim 1 further comprising an antioxidant selected from the group consisting of 3,5-bis(1,1-dimethylethyl)-4-hydroxy benzenepropanoic acid,2,2-bis[[3-[3,5-bis(1,1-dimethylethyl)-4-hydroxyphenyl]-1-oxopropoxy -]methyl]1,3-propanediyl ester; Vitamin E; Tinuvins; butylated hydroxytoluene; butylated hydroxyanisole; and any combination thereof.

15. The water-based ink composition of claim 1 further comprising a freeze/thaw stabilizer selected from the group consisting of low molecular weight alcohols, glycols, glycerols, and combinations thereof.

16. An ink system comprising:
a) an oil-in-water emulsion comprising:
i) water;
ii) an organic solvent;
iii) a colorless coloring agent dissolved in the organic solvent; and
iv) an emulsifier; and
b) a color developer separate from the oil-in-water emulsion.

17. The ink system of claim 16 wherein the organic solvent is saturated with the coloring agent.

18. The ink system of claim 16 wherein the organic solvent with the coloring agent dissolved therein is emulsified in the water.

19. The ink system of claim 16 wherein the water is present in an amount of about 30-97% by weight.

20. The ink system of claim 16 wherein the coloring agent is a leuco dye.

21. The ink system of claim 16 wherein the coloring agent is a leuco dye present in an amount of up to about 5% by weight.

22. The ink system of claim 16 wherein the coloring agent is a leuco dye selected from the group consisting of phthalide dyes, diarylphthalide dyes, quinone dyes, fluoran dyes, indolyphthalide dyes, acylluecoazine dyes, leucoauramine dyes, spiropyrane dyes, rhodaminelactam dyes, triarylmethane dyes, and chromene dyes, and combinations thereof.

23. The ink system of claim 16 wherein the coloring agent is a leuco dye selected from the group consisting of Spiro (12H-benzo(a)xanthene-12,1'(3'H)isobenzofuran-3'-one,9-(diethylamino), 3-[Butyl-2-methylindol-3-yl]-3-(1-octyl-2-methylindol-3-yl)-1(3H)isoben-zofuranone, 2-'phenylamino-3'-methyl-6'-(dibutylamino)spiro[isobenzofuran-1(3H), 9'-(9H)-xanthen]-3-one, substituted Phthalide, 2'-Di(phenylmethyl)amino-6'-(diethylamino)spiro(isobenzofuran-1(3H), 9'(9H)xanthen)-3-one.

24. The ink system of claim 16 wherein the organic solvent is present in an amount of about 1-70% by weight.

25. The ink system of claim 16 wherein the organic solvent is selected from the group of consisting of dimethyl adipate, diethyl succinate, dibutyl phthalate, chlorinated fluorinated toluenes, dibutyl maleate, canola oil, fatty acid methyl esters and combinations thereof.

26. The ink system of claim 16 wherein the emulsifier is present in an amount of about 0.1-25% by weight.

27. The ink system of claim 16 wherein the emulsifier is selected from group consisting of ethoxylated alcohols, POE caster oil, and glycerol esters.

28. The ink system of claim 16 further comprising an antioxidant selected from the group consisting of 3,5-bis(1,1-dimethylethyl)-4-hydroxy benzenepropanoic acid,2,2-bis[[3-[3,5-bis(1,1-dimethylethyl)-4-hydroxyphenyl]-1-oxo-propoxy-]methyl]1,3-propanediyl ester; Vitamin E; Tinuvins; butylated hydroxytoluene; butylated hydroxyanisole; and any combination thereof.

29. The ink system of claim 16 further comprising an freeze/thaw stabilizer selected from the group consisting of low molecular weight alcohols, glycols, glycerols, and combinations thereof.

30. The ink system of claim 16 wherein the color developer is disposed on paper.

31. The ink system of claim 16 wherein the color developer is disposed on paper and is selected from one or more Lewis acids.

32. A method of forming a colorless water-based ink composition comprising the steps of:
  dissolving a colorless coloring agent in an organic solvent; and
  emulsifying the organic solvent containing the colorless coloring agent in water.

33. The method of claim 32 wherein the dissolving step includes saturating the organic solvent with the coloring agent.

34. The method of claim 32 further comprising the step of mixing the organic solvent containing the coloring agent with an emulsifier before the emulsifying step.

35. A colorless water-based ink composition comprising:
  water;
  an organic solvent;
  a colorless coloring agent dissolved in the organic solvent; and
  an emulsifier having an HLB value of about 8 or greater;
  the organic solvent which contains the dissolved colorless coloring agent is emulsified in the water,
  wherein a visible color results when the coloring agent reacts with a color developer.

36. The water-based ink composition of claim 35 wherein the emulsifier has an HLB value of between about 10 and about 18.

37. A colorless emulsified water-based ink composition produced by:
  dissolving a colorless coloring agent in an organic solvent to form a solution;
  adding an emulsifier and the solution to water; and
  emulsifying the solution in the water.

38. A water-based ink system produced by:
  treating the surface of a substrate with a color developer to form a coated substrate;
  applying the colorless emulsified water-based ink composition of claim 37 to the coated substrate, wherein a visible color results when the coloring agent reacts with the color developer.

* * * * *